United States Patent [19]

Tezuka

[11] Patent Number: 4,679,101
[45] Date of Patent: Jul. 7, 1987

[54] INFORMATION RECORDING OR ERASING APPARATUS

[75] Inventor: Nobuo Tezuka, Kanagawa, Japan

[73] Assignee: Canon Kabushiki Kaisha, Tokyo, Japan

[21] Appl. No.: 526,038

[22] Filed: Aug. 24, 1983

[30] Foreign Application Priority Data

Aug. 25, 1982 [JP] Japan ................... 57-147290

[51] Int. Cl.⁴ .................... G11B 5/02; G11B 5/09
[52] U.S. Cl. ......................... 360/60; 360/132
[58] Field of Search .............. 360/60, 99, 93, 132, 360/133

[56] References Cited

U.S. PATENT DOCUMENTS

| 3,032,285 | 5/1962 | Brede | 242/208 |
| 3,785,658 | 1/1974 | Ikeda | 360/60 |
| 3,821,799 | 6/1974 | Sumiyoshi | 360/60 |
| 4,000,515 | 12/1976 | Fukawa | 360/60 |
| 4,106,064 | 8/1978 | Hoshido | 360/60 |

FOREIGN PATENT DOCUMENTS

| 55-1665 | 1/1980 | Japan | 360/60 |
| 2102188 | 1/1983 | United Kingdom | 360/133 |

Primary Examiner—Raymond F. Cardillo
Assistant Examiner—Alyssa H. Bowler
Attorney, Agent, or Firm—Toren, McGeady & Associates

[57] ABSTRACT

Apparatus for use with a cassette housing a recording medium including a recording-erasing apparatus and an inhibit device for inhibiting signal recording or erasing in accordance with a cassette loaded in the apparatus. According to a preferred embodiment, the apparatus may include a manually operable mechanism for enabling signal recording or erasing regardless of the inhibit device.

26 Claims, 8 Drawing Figures

INFORMATION RECORDING OR ERASING APPARATUS

BACKGROUND OF THE INVENTION

1. Field of the Invention

This invention relates to an information recording or erasing apparatus.

2. Description of the Prior Art

Recording or erasing apparatuses of the kind using a recording medium such as a magnetic sheet or magnetic tape which permits information writing or recording thereon or erasing of recorded information therefrom are apt to have drawbacks in that information may be recorded by mistake on a wrong track which already has information recorded thereon or existing recorded information may be inadvertently erased. In a conventional known method, such errors have been prevented by providing a cassette with means for inhibiting recording information in or erasing recorded information from the recording medium (such as an erroneous erasing preventing claw). When a cassette having this device set in a record or erase inhibiting mode is loaded on the recording or erasing apparatus, the apparatus is inhibited from recording or erasing. In cases where new information is to be recorded by erasing existing recorded information from the recording medium contained in the cassette which has been set in the write or erase inhibiting mode, the cassette must be somehow modified to bring it back to an original state from the inhibiting mode.

In another known prior art method for preventing the above-stated errors, the cassette containing a recording medium is provided with a counter which is arranged to indicate the amount of the recording medium which has been used such as the length of the tape portion or the number of recording tracks that have been used for recording. In that case, when the apparatus is loaded with the cassette containing a partially recorded recording medium, the cassette is arranged to render the apparatus incapable of recording or erasing within a part of the recording medium indicated by the counter and to allow the apparatus to perform recording only on the remaining portion of the recording medium after the indicated part. With this method applied to a recording or erasing apparatus, if new information is to be recorded by erasing the recorded information existing in the recorded portion of the recording medium, the counter indication on the cassette must be adjusted to a recording track to be used for recording the new information.

All the methods of the prior art described above thus necessitate some additional work on the cassette or the counter in cases where information is to be newly written or recorded on the recording medium. This has degraded the operability of the apparatus. The inconvenience resulting from the degraded operability increases especially in a case where such work is required when the apparatus has already been loaded with the cassette because the cassette must once again be taken out from the body of the apparatus.

SUMMARY OF THE INVENTION

It is therefore the principal object of this invention to provide an information recording-erasing apparatus which is capable of eliminating the above-stated inconveniences of the apparatuses of the prior art.

It is a more specific object of the invention to provide an information recording-erasing apparatus which includes means for permitting a writing (recording) or erasing operation to be performed without any additional work on the cassette containing a recording medium when setting means provided on the cassette is set into a mode inhibiting an information writing or erasing operation, so that the above stated degradation of operability can be avoided.

To attain this object, a preferred embodiment of the invention is provided with first means which is arranged to operate either in a state of enabling the apparatus to write information onto the recording medium or to erase recorded information from the recording medium or in another state of inhibiting the apparatus from information writing or erasing accordingly as the setting means of the recording medium containing cassette is set in a mode permitting information writing on the recording medium or erasing information recorded on the recording medium or is set in an inhibiting mode inhibiting such a writing or erasing operation; and second means which is arranged to permit information writing onto the recording medium or erasing recorded information from the recording medium when the first means is in the inhibiting state.

It is another object of the invention to provide an information recording-erasing apparatus wherein there is provided means for permitting information writing (recording) or erasing without necessitating any operation on the indicating part arranged on a cassette containing a recording medium to indicate the used amount of the recording medium, when the phase of the indicating part is not in agreement with the phase of drive means for driving the indicating part.

To attain this object, a preferred embodiment of the invention is provided with first means which is arranged to operate either in a state of enabling the apparatus to write or record information onto the recording medium or to erase recorded information from the recording medium or in another state of inhibiting the apparatus from information writing or erasing accordingly as the phase of the indicating part indicating the used amount of the recording medium in the cassette is in agreement or not in agreement with that of the indicating part driving means; and second means which is arranged to permit information writing onto the recording medium or erasing recorded information from the recording medium when the first means is in the inhibiting state.

It is a further object of the invention to provide an information recording-erasing apparatus wherein there is provided means for automatically rendering the above-stated writing or erasing permitting means inoperative in response to an unloading or loading operation on a recording medium containing cassette.

To attain that object, another preferred embodiment of the invention is provided with first means which is arranged to operate either in a state of enabling the apparatus to write or record information onto the recording medium or to erase recorded information from the recording medium or in another state of inhibiting the apparatus from information writing or erasing; second means which is arranged to permit information writing onto the recording medium or erasing recorded information from the recording medium when the first means is in the inhibiting state; and third means which is arranged to render the second means inoperative in response to an unloading or loading operation on the recording medium.

These and further objects and features of the invention will become apparent from the following detailed description of preferred embodiments thereof taken in connection with the accompanying drawings.

BRIEF DESCRIPTION OF THE DRAWINGS

FIG. 2 is a top view showing the information recording-erasing apparatus to be loaded with the cassette shown in FIG. 1.

FIG. 3 is a sectional view taken along a line A—A of FIG. 2 showing a writing or erasing control switch part.

FIG. 4 is a plan view showing the position of a head and the upper part of a counter control part.

FIG. 5 is a plan view showing the lower part of the above-stated counter control part.

FIG. 6 is a sectional view taken along a line B—B of FIG. 5 showing a counter driving part.

FIG. 7 is a plan view showing an eject switch part shown in FIG. 5.

FIG. 8 is a block diagram showing a writing or erasing control part.

DETAILED DESCRIPTION OF PREFERRED EMBODIMENT

Figure 1:
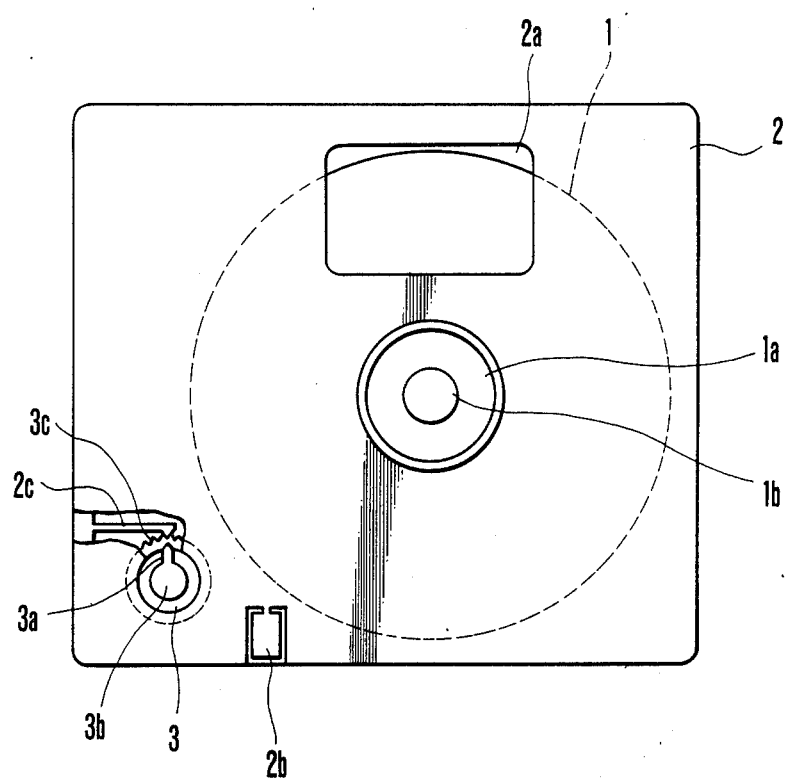
FIG. 1 is a plan view showing a cassette to be used for an information recording-erasing apparatus according to the present invention.

Referring to FIG. 1 which shows by way of example a cassette 2 containing therein as a recording medium to be used in accordance with the present invention, a magnetic sheet 1 provided with a center hub 1a. The center hub 1a is provided with a hole 1b which is arranged in the middle of the center hub 1a to be coupled with a rotating drive shaft. The cassette 2 is further provided with an opening 2a which is arranged to have a recording head inserted therein together with a stabilizing member or the like arranged to stabilize the travel of the magnetic sheet. Reference numeral 2b denotes a writing (recording) or erasing inhibition setting member. The cassette 2 is set in a writing (recording) or erasing permitting mode with this writing or erasing inhibition setting member 2b attached to the body of the cassette 2. With this setting member attached, the apparatus is allowed to write in (or record) information on the magnetic sheet 1 or to erase information recorded on the sheet 1. However, the cassette is set in a writing (recording) or erasing inhibition mode with the member 2b removed from the cassette. In that instance, the apparatus is arranged to be inhibited from writing (or recording) information or erasing recorded information even if the apparatus is loaded with the cassette 2. In this specific example, a counter 3 is provided on the cassette 2 as an indicating part for indicating a recorded track position or, in other words, the amount of the magnetic sheet which has been used. In the case of a magnetic sheet 1 of the type having recording tracks concentrically arranged, the counter indicates the number of recorded recording tracks. The counter 3 is driven to rotate accordingly as the recording head moves and is arranged to indicate the number of recorded tracks by the phase of a key way 3a formed continuously from a shaft hole 3b of the counter 3. The counter 3 can be manually set from outside at a desired phase. When the cassette is loaded on the apparatus with the counter 3 having been set in that manner, recording or erasing becomes impossible until the head comes to a recording track corresponding to this set phase. Then, recording or erasing is allowed to be performed when the head is moved forward and passes the track indicated by the counter 3. The cassette 2 is further provided with a resilient pawl 2c which is arranged to engage a ratchet part 3c provided along the periphery of the counter 3.

Figure 2:
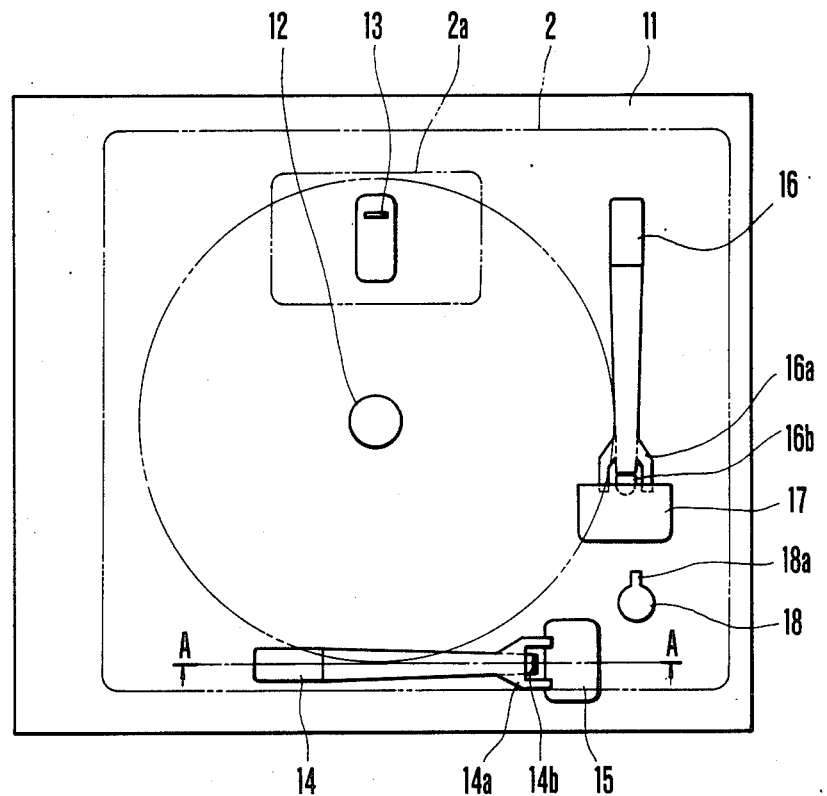
FIGS. 2 through 8 illustrate an information recording-erasing apparatus embodying the present invention.
Figure 3:
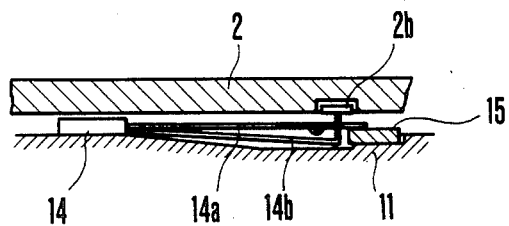

Referring now to FIG. 2, a reference numeral 11 denotes a casing of a recording-erasing apparatus embodying the invention; 12 denotes a rotary driving shaft arranged to cause a magnetic sheet 1 to rotate; 13 denotes a magnetic recording-erasing head arranged to perform a recording or erasing operation on the magnetic sheet 1; 14 denotes a writing (recording)-erasing control switch provided with contact pieces 14a and 14b which are arranged to be in an open state when a cassette 2 having a writing (recording) inhibition setting member 2b attached thereto is loaded as shown in FIG. 3 (which is a sectional view taken along the line A—A of FIG. 2) and to be in a closed state when a cassette 2 having the member 2b removed therefrom is loaded; and 15 denotes a position restricting member arranged to restrict the position of the contact piece 14a. The embodiment is provided with a switch 16 which is arranged to produce a cassette loading signal. Upon completion of a cassette loading operation on the apparatus, a contact piece 16a of the switch 16 is pushed by the lower surface of the cassette 2 and thus two contact pieces 16a and 16b of the switch 16 are brought into a closed state. The positions of the two contact pieces 16a and 16b are restricted by a position restricting member 17. A drive part 18 is arranged to drive the counter 3 which is provided on the cassette 2. The drive part 18 is provided with a protrudent part 18a for engagement with the key way 3a of the counter when the drive part 18 is inserted into the shaft hole 3b.

Figure 4:
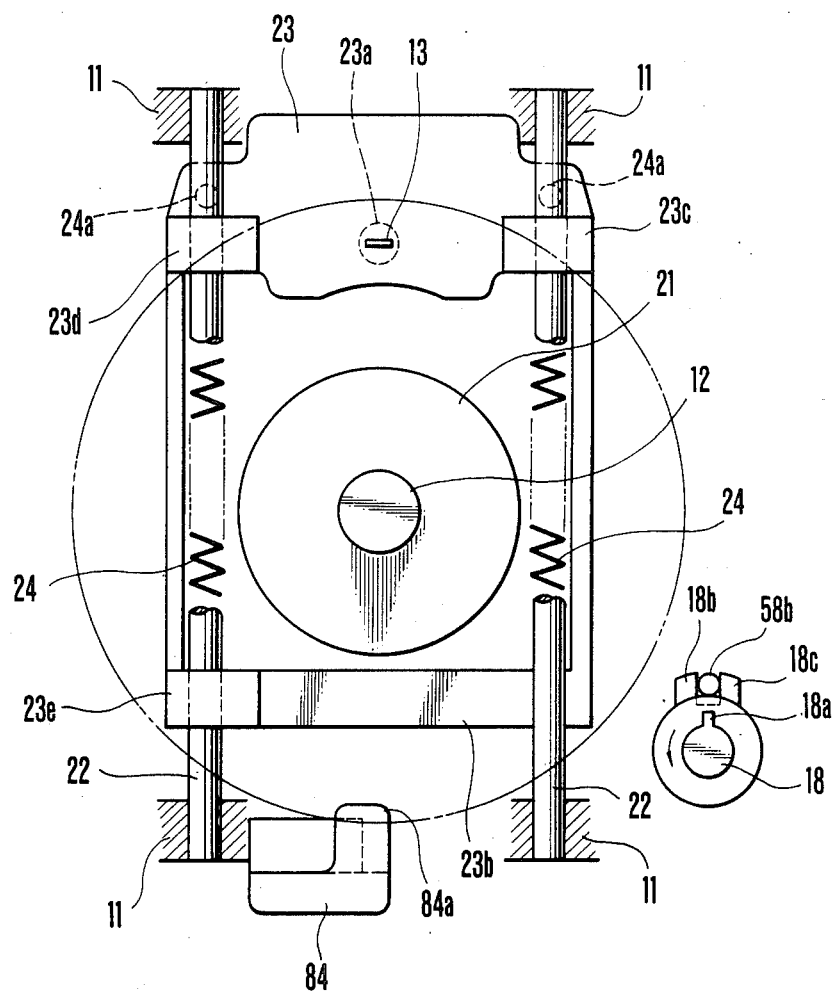
Figure 5:
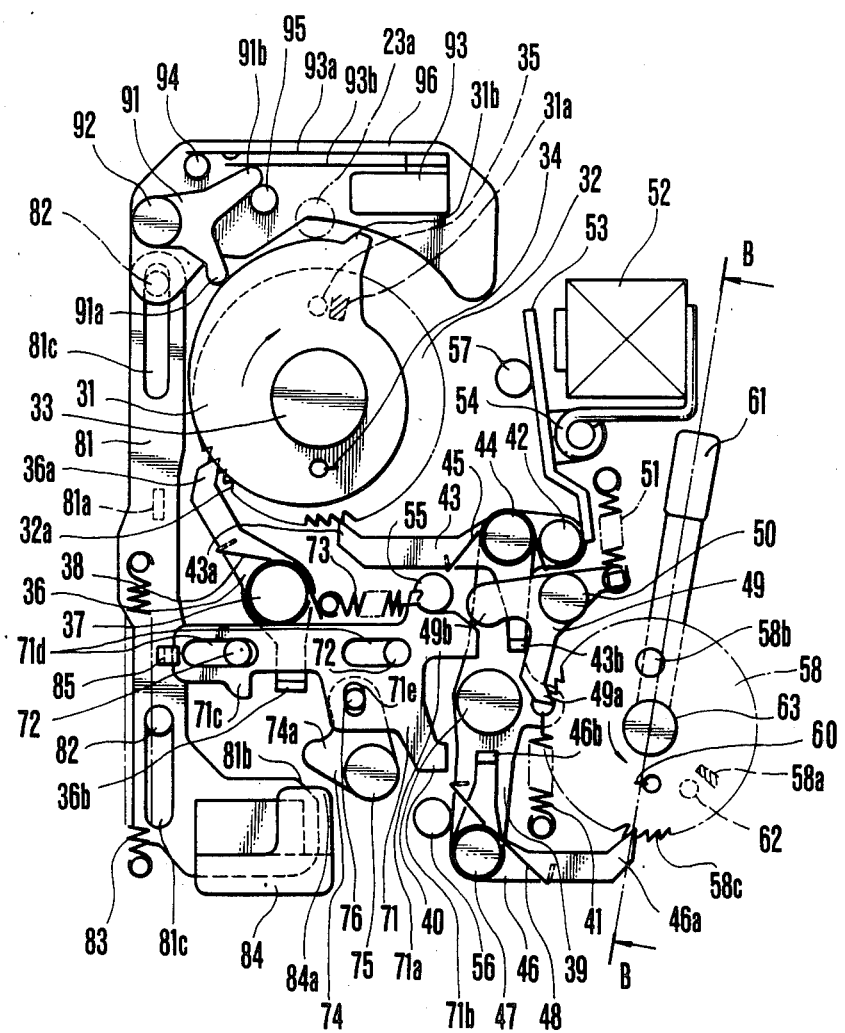

The details of the structural arrangement relative to the position of the head and a counter control part of the embodiment are as shown in FIGS. 4 and 5. To simplify the illustration, FIG. 4 shows a head carrier arranged in the upper part of the apparatus while FIG. 5 shows the control part disposed in the lower part of the apparatus. The illustrations of FIGS. 4 and 5 are drawn to a larger scale than FIGS. 1 and 2. In this specific embodiment, the head is arranged to be fed by the resilience of a charged resilient member. However, it is to be understood that the invention is not limited to the use of such a head feeding drive source. Referring to FIG. 4, the head carrier part includes the above-stated magnetic head 13 for recording or erasing; a motor 21 which drives the drive shaft 12 for driving the magnetic sheet 1; guide rails 22 which are arranged in parallel with the casing 11 respectively; a head carrier 23 which are guided by these guide rails 22 at three points 23c, 23d and 23e and is arranged to be axially movable. Springs 24 which are arranged between the casing 11 and the head carrier 23 urge the head carrier 23 to move downward as viewed on FIG. 4. The head carrier 23 is provided with pins 24a. One end of each of the springs 24 is attached to the pin 24a while the other end is secured to the casing 11. The head carrier 23 is further provided with a cam follower 23a.

Referring now to FIG. 5, a control cam 31 is pivotally carried by a shaft 33 to be rotatable on the shaft. The above-stated cam follower 23a is arranged to abut upon the cam surface of the control cam 31. A cam drive wheel 32 is formed as a unified body with the control cam 31 and is provided with a ratchet part 32a which is formed along the periphery thereof. The ratchet part 32a is arranged to engage a cam control pawl and a cam drive pawl which will be described later herein. The control cam 31 is provided with a spring 34 which exerts an urging force on the cam 31 to urge it counterclockwise. A numeral 36 denotes the cam control pawl which is urged by a spring 38 to turn clockwise on a shaft 37. The tip claw part 36a of the cam control pawl 36 engages the ratchet part 32a of the cam drive wheel 32. Accordingly, the counterclockwise turning movement of the control cam 31 urged by the spring 34 is normally restricted by this cam control pawl 36. A pawl drive lever 39 is urged to turn clockwise on a shaft 40 by the force of a spring 41. However, the position of the pawl drive lever 39 is restricted by a pin 56. A numeral 43 denotes the above-stated cam drive pawl which is pivotally carried by a shaft 44 which is provided at one end of the pawl drive lever 39. A spring 45 urges the cam drive pawl 43 to turn clockwise on the shaft 44. The tip claw part 43a of the cam drive pawl 43 is arranged to be capable of engaging the peripheral ratchet part 32a of the cam drive wheel 32 in the clockwise direction. The position of the cam drive pawl 43 is restricted by a pin 55. The pawl drive lever 39 is provided with a pin 42 which is located close to the shaft 44.

A counter drive pawl 46 is pivotally carried by a shaft 47 which is provided on the other end of the pawl drive lever 39. The counter drive pawl 46 is urged to turn counterclockwise by a spring 48. The tip claw part 46a of the counter drive pawl is arranged to engage counterclockwise with a ratchet part 58c formed along the periphery of a counter drive wheel 58. The counter drive wheel 58 is rotatable on a shaft 63 and has a turning force of a spring 60 exerted clockwise thereon. The force of the spring 60 is weaker than the holding force of the resilient pawl 2c which engages the ratchet part 3c of the counter 3 and holds on there. The peripheral ratchet part 58c of the counter drive wheel 58 is formed at the same angle of pitch as that of the peripheral ratchet part 3c of the counter 3 which is disposed on the cassette 2 as shown in FIG. 1. A counter control pawl 49 is urged by a spring 51 to turn counterclockwise on a shaft 50. The tip claw part 49a of the counter control pawl 49 engages the peripheral ratchet part 58c of the counter drive wheel 58.

The embodiment includes an electromagnet 52 and an armature 53 which is arranged to be attracted by the electromagnet 52 when the latter is excited. The armature 53 causes a shaft 54 to turn clockwise when it is attracted by the electromagnet 52. The position of the armature 53 is restricted by a stopper 57. The clockwise rotation of the armature 53 inflicts an impact on the pin 42 which is provided on the pawl drive lever 39. This causes the pawl drive lever 39 to turn counterclockwise. As a result, the cam drive wheel 32 is caused to turn clockwise via the cam drive pawl 43. The extent of this turning movement is arranged to be at least 1 pitch and not in excess of 2 pitches of the ratchet part 32a of the cam drive wheel 32. Meanwhile, the spring 34 exerts a returning rotative force on the control cam 31. With this rotative force arranged to be larger than another rotative force exerted on the control cam 31 by the above-stated spring 24 (FIG. 4), the control cam 31 is controlled by the control pawl 36 and turns clockwise by one pitch every time the electromagnet 52 is excited. The degree of reduction in cam lift resulting from the one pitch turn of the control cam 31 is arranged to correspond to one track pitch on the magnetic sheet 1. Such being the arrangement, the head 13 can be moved stepwise from one recording track to another. The details of the head feeding and positioning control on the head 13 of the apparatus are as disclosed in Japanese Patent Application No. SHO 57-124262 and corresponding U.S. patent application Ser. No. 513,164, filed July 13, 1983, filed by the present applicant. With the pawl drive lever 39 turned counterclockwise on the other hand, the drive wheel 58 is caused to turn also counterclockwise through the counter drive pawl 46. Then, in the same manner as in the case of the control cam 31, the counter drive wheel 58 also moves stepwise by one pitch of the ratchet part 58c at a time. Further, in this specific embodiment example, the intermittent motion is arranged to be caused by excitation of the electromagnet 52. However, in case where the magnetic sheet 1 has a recording track arranged in a spiral shape, the intermittent motion mechanism which has been described above may be replaced with a continuous motion mechanism.

Figure 6:
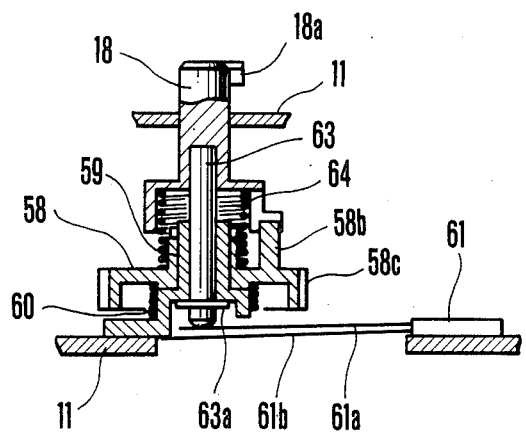

FIG. 6 is a sectional view taken along a line B—B of FIG. 5 and shows the details of the counter drive part of the embodiment. The casing 11 is provided with a bearing part 59, which pivotally carries the counter drive wheel 58. A shaft 63 is rotatably disposed in the middle of the bearing part 59 and is also arranged to be axially movable. Meanwhile the counter drive shaft 18 is connected to the fore end of the shaft 63 in one unified body therewith. Between the drive shaft 18 and the drive wheel 58 is inserted a spring 64 which is arranged to produce an urging force in the axial direction. The upward movement of the shafts 63 and 18 due to the spring 64 is restricted by a retaining member 63a. The drive wheel 58 is provided with a pin 58b which is interposed in between the two protrudent parts 18b and 18c of the drive shaft 18 as shown in FIG. 4 and thus causes the drive wheel 58 and the drive shaft 18 to rotate together.

The switch 61 normally has its contact pieces 61a and 61b in an open state as shown in FIG. 6. When the apparatus is loaded with the cassette 2 and the phase of the key way 3a of the counter 3 disposed on the cassette 2 (see FIG. 1) comes to coincide with the phase of the protrudent part 18a of the drive shaft 18 disposed on the side of the recording apparatus (see FIGS. 2, 4 and 6), the protrudent part 18a enters into the key way 3a. As a result of that, the counter drive part and the switch 61 come to be in their conditions as shown in FIG. 6. However, in case where the phase of the protrudent part 18a does not coincide with that of the key way 3a, the protrudent part 18a is pushed down by the lower surface of the counter 3. As a result, the shafts 63 and 18 move downward against the urging force of the spring 64. Then, the contact pieces 61a and 61b of the switch 61 are brought into a closed state. However, since the pin 58b of the counter drive wheel 58 still remains engaged with the protrudent parts 18b and 18c of the counter drive shaft 18, the drive wheel 58 and the drive shaft 18 turn together. Then, when the phase of the key way 3a and the protrudent part 18a come to coincide with each other, the urging force of the spring 64 brings the shaft 18 and the wheel 58 back to their conditions as shown in FIG. 6. This causes the switch 61 to open.

Again referring to FIG. 5, the apparatus is provided with a reset lever 71. The lever 71 has slots 71d which are arranged to fit on a shaft 72 and thus to be movable left and right as viewed on the drawing. Normally, however, the reset lever 71 stays in a state of having been moved to the left by the urging force of a spring 73 as shown in the drawing. A reset drive lever 74 is pivotally carried by a shaft 75 and is turnable on the shaft. A pin 76 is provided on the arm part of the reset drive lever 74 and is arranged to fit in the slot 71e of the reset lever 71.

Figure 7:
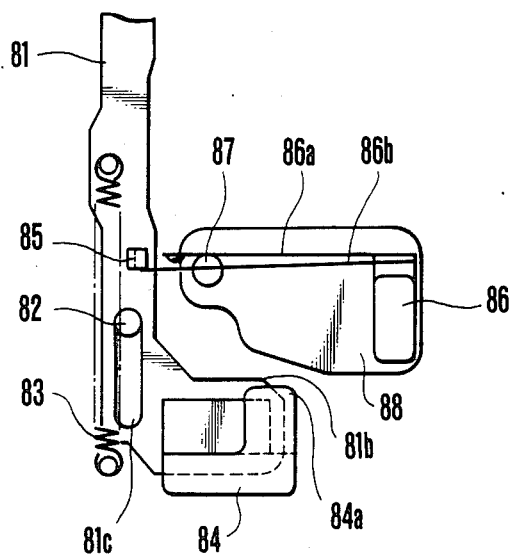

An eject lever 81 is provided with slots 81c which are arranged to fit on a shaft 82. The lever 81 is thus arranged to be movable upward and downward as viewed on FIG. 5 and is normally urged to move downward by a spring 83. The eject lever 81 is formed in one unified body with an eject button 84. Further, the eject lever 81 is provided with a switch drive member 85. Under the condition as shown in FIG. 5, the switch drive member 85 pushes a contact piece 86b of an eject switch 86 in such a way as to prevent it from coming into contact with another contact piece 86a as shown in FIG. 7. Referring to FIG. 7, the position of the contact piece 86a is restricted by a pin 87. The switch 86 and the pin 87 are disposed on a base plate 88.

In FIG. 5, a reference numeral 91 denotes a switch drive lever. The lever 91 is pivotally carried by a shaft 92 and is turnable on the shaft. A contact piece 93b of a last track switch 93 is arranged to urge the switch drive lever 91 to turn clockwise. However, the position of the lever 91 is restricted by a pin 95. With the head 13 shifted step by step, when the control cam 31 comes to a point corresponding to the last track, the protrudent part 31b of the control cam 31 pushes one arm part 91a of the switch drive lever 91 to cause the lever 91 to turn counterclockwise. As a result, the other arm part 91b of the lever 91 pushes the contact piece 93b of the switch 93 to bring the contact pieces 93a and 93b into a closed state. With the last track switch 93 thus operated, a control circuit which is not shown prevents the head 13 from further shifting its position. In the drawing, a numeral 94 denotes a pin which restricts the position of the contact 93a; and 96 denotes a base plate. The switch 93 and the switch drive lever 91 are disposed on the base plate 96.

With the embodiment arranged as has been described in the foregoing, the cassette 2 is taken out or loaded by pushing the eject button 84 upward as viewed on FIG. 5. As a result of this, the contact pieces 86a and 86b of the eject switch 86 which have been in an open state are brought into a closed state by the switch drive member 85 (see FIG. 7). Then, an eject signal is produced to inhibit the operation of a recording or erasing circuit and to promptly bring the motor 21 to a stop. When the eject button 84 is further pushed, the tip 84a of the eject button 84 comes to abut on one end 23b (FIG. 4) of the head carrier 23. Then, the eject button 84 pushes the head carrier 23 upward as viewed on FIG. 4 and, at the same time, the head carrier drive spring 24 is charged.

During the process of charging the head carrier drive spring 24, a slanting side face 81b of the eject lever 81 comes to abut on one end 74a of the reset drive lever 74. This causes the lever 74 to turn clockwise. Then, the reset lever 71 is in turn caused to move to the right through the pin 76. As a result, the first arm 71a of the reset lever 71 comes to abut on the arm part 49b of the counter control pawl 49. The control pawl 49 is thus caused to turn clockwise. The claw part 49a of the counter control pawl 49 is disengaged from the ratchet part 58c of the counter drive wheel 58. Further, the tip of the first arm 71a then pushes an uprising part 43b of the cam drive pawl 43 to cause the drive pawl 43 to turn counterclockwise. This disengages the claw part 43a from the ratchet part 32a of the cam drive wheel 32.

Meanwhile, the rightward move of the reset lever 71 causes the tip of its second arm 71b to push the uprising part 46b of the counter drive pawl 46. As a result of that, the drive pawl 46 turns clockwise to disengage its claw part 46a from the ratchet part 58c of the counter drive wheel 58. Further, the third arm 71c of the reset lever 71 pushes the uprising part 36b of the cam control pawl 36 to cause the control pawl 36 to turn counterclockwise and thus to disengage its claw part 36a from the ratchet part 32a of the cam drive wheel 32.

With these claw parts disengaged from the ratchet part, the control cam 31 is caused to turn counterclockwise by the urging force of the spring 34 and comes back to its initial phase where the protrudent part 31a of the control cam 31 abuts on the stopper pin 35. Then, the urging force of the spring 60 causes the counter drive wheel 58 to turn clockwise if the apparatus is not loaded with the cassette 2. In that instance, the clockwise movement of the counter drive wheel continues until it comes back to a phase at which the protrudent part 58a of the wheel 58 abuts on the stopper pin 62. If the apparatus is loaded with the cassette 2 on the other hand, the counter drive wheel 58 does not return to its original position as the force of the spring 60 is weaker than the holding force of the resilient pawl 2c on the counter 3. Therefore, the return to the original position takes place when the key way 3a of the counter 3 is disengaged from the protrudent part 18a of the counter drive shaft 18 in taking out the cassette 2.

After the head carrier 23 is brought back to its initial position with the eject button 84 pushed, a cassette receiving part is opened by a mechanism which is not shown to permit the cassette 2 to be either taken out or loaded.

Upon completion of cassette loading with the cassette 2 inserted into the cassette receiving part of the apparatus, the switch 16 (see FIG. 2) operates to produce a cassette loading signal. The electromagnet 52 is excited by this signal. As a result, the control cam 31 and the counter drive wheel 58 move stepwise and thus respectively move from their initial phase at which they abut on the stopper pins 35 and 62 to the phase which corresponds to a first recording track. After that, the head 13 and the counter 3 move stepwise to an extent corresponding to one track every time the electromagnet 52 is excited so that the number of recording tracks on which information has been recorded (or written in) can be indicated.

Figure 8:
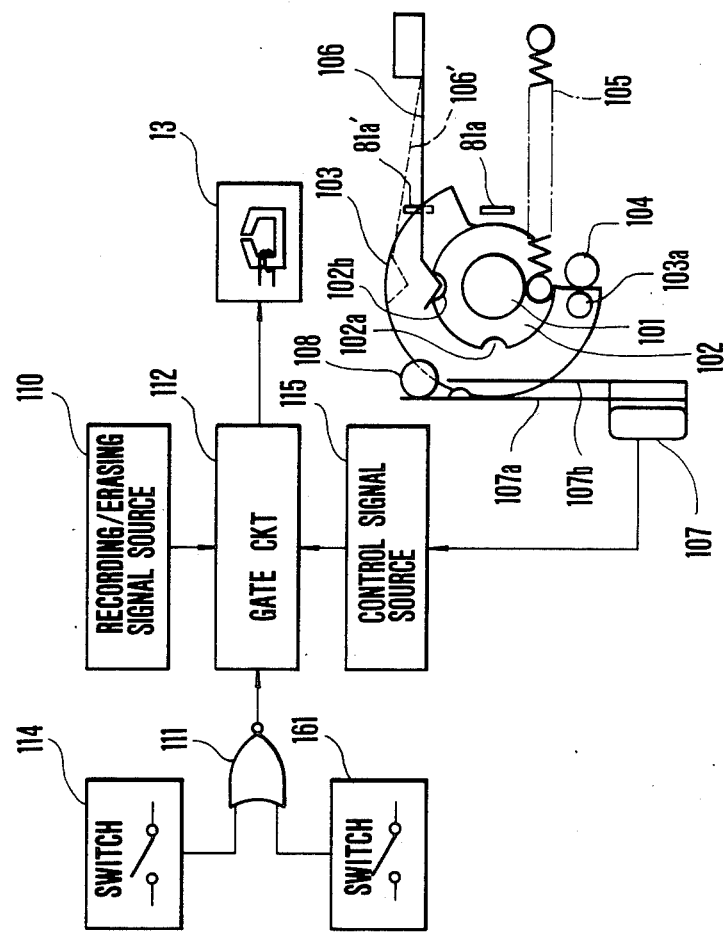

FIG. 8 shows the channels of the control part of the embodiment which is arranged to control an information writing or erasing operation. The control part includes a signal source 110 for a recording or erasing signal. The signal produced from the signal source 110 is supplied to the head 13 via a gate circuit 112. In this specific embodiment the gate circuit 112 is controlled either to cut off the supply of the signal from the signal source 110 to the head 13 or to release the supply from the cut off state. A control signal source 114 includes the writing (recording) or erasing control switch 14 shown in FIG. 3. This signal source 114 detects the setting status of the writing-erasing (hereinafter will be simply called writing) inhibition setting member 2b and produces a control signal according to the setting status. A numeral 161 denotes another control signal source which includes the counter switch 61 of FIG. 5. The control signal source 161 detects whether or not the phase of the key way 3a of the counter 3 coincides with the phase of the protrudent part 18a of the counter drive shaft 18 of the recording-erasing apparatus (see FIGS. 1, 2 and 6) and produces a signal according to the result of this detection. A NOR circuit 111 is connected to the control signal sources 114 and 161. When the switch 14 turns on with the writing inhibition setting member 2b set in a writing inhibiting state or when the switch 61 turns on with the phase of the key way 3a and that of the protrudent part 18a not coinciding with each other, the output level of the NOR circuit 111 becomes low to shut off the gate circuit 112. The output level of the NOR circuit 111 becomes high only when both the switches 14 and 61 are off and releases the gate circuit 112 from the shut-off state in that instance.

In order that a writing-in or recording operation can be performed without any additional work on the cassette 2 when the cassette is set in the writing inhibiting state as mentioned in the foregoing, the embodiment is provided with the following means: Again referring to FIG. 8, an external operation knob which is not shown is attached to a rotating shaft 101. A click plate 102, a rotation limiting plate 103 and a switch drive pin 103a are arranged in one unified body. A spring 105 exerts an urging force on the shaft 101 to urge it to turn counterclockwise. Normally, however, the shaft 101 stays in the position as shown in the drawing with the rotation limiting plate 103 restricted by a stopper 104. Numerals 106 and 107 respectively denote a click spring and a switch. The switch 107 normally has its contact pieces 107a and 107b in an open state and is arranged to have them in a closed state when the rotation of the shaft 101 causes the pin 103a to push the contact piece 107b. The position of the contact piece 107a is restricted by a member 108.

Normally, a recess 102b of the click plate 102 is at a phase engaging the click spring 106 and the switch 107 remains open. Under this condition, when the above-stated external operation knob is operated to bring the click spring 106 into engagement with another recess 102a of the click plate 102, the switch drive pin 103a pushes the contact piece 107b to turn on the switch 107. With the switch 107 thus turned on, a high level signal is supplied from the control signal source 115 to the gate circuit 112. This signal releases the gate circuit 112 from a shut-off state even if the gate circuit is in such a state. Then, a recording or erasing signal is supplied from the signal source 110 to the head 13 to enable the head 13 to perform a normal recording or erasing operation. Further, the counterclockwise driving force of the spring 105 on the shaft 101 is arranged to be smaller than the force with which the click spring 106 engages the recess 102a of the click plate 102. In this case, if the end part 81a of the above-stated eject lever 81 (FIG. 5) is moved to a position 81a' as a result of pushing operation on the eject lever 81 as shown in FIG. 8, the click spring 106 is deflected upward thereby as indicated by a numeral 106' in FIG. 8. In that event, the click spring 106 disengages the recess 102a of the click plate 102. As a result of that, the urging force of the spring 105 brings the shaft 101 back to its original position. The switch 107 turns off with the contact pieces 107a and 107b coming into an open state. The output level of the control signal source 115, therefore, becomes low and thus comes to have no control effect on the gate circuit 112. As a result of that, therefore, the gate circuit 112 becomes controlled by the output of the NOR circuit 111. Of course, it is possible to return the shaft 101 to the original position by manual operation from the outside of the apparatus regardless of the operation of the eject lever 81.

In the example described, the supply of the recording or erasing signal from the signal source 110 to the head 13 is arranged to be controlled by means of the signals produced from the signal sources 114 and 161 via the NOR gate 111 and the gate circuit 112. However, this control arrangement may be replaced for example with another arrangement in which, when the apparatus is loaded with a cassette having writing inhibition setting member 2b set in the writing inhibiting mode or when the phase of the recording track position indicating part (such as the counter 3) is not coinciding with the phase of the means arranged to drive this indicating part, the recording or erasing button of the recording apparatus is arranged to be inoperable under that condition and is arranged to be made operable by the operation of an operation switch in that instance. Further, if the cassette is to be taken out under that condition (for example, by turning off the cassette loading switch), the apparatus may be brought back to the inoperative state.

In accordance with the present invention, as has been described in detail in the foregoing, when a recording medium containing cassette has its setting means set in a state of inhibiting an information writing (or recording) or erasing operation on the recording medium, the information writing or erasing operation on the recording medium can be carried out as desired without any additional work on the recording medium containing cassette.

Further, when the phase of the indicating part which indicates the used amount of the recording medium does not coincide with the phase of the means for driving the indicating part, information can be written in or recorded on a desired part of the recording medium or information already recorded can be erased from any desired part of the recording medium without any additional work on the indicating part and irrespectively of the phase of the indicating part.

It is another feature of the invention that the means for permitting information writing or erasing under a condition inhibiting writing information or erasing recorded information is arranged to be rendered inoperative in response to a recording medium container unloading or loading operation, so that inadvertent overlapped recording or erasing of recorded information on a newly loaded recording medium can be effectively prevented.

This invention thus permits salient improvement in the operability of an information recording apparatus.

While an apparatus of the kind using a disc shaped rotary magnetic sheet as recording medium has been described in the foregoing description of the embodiment example, it is to be understood that the invention is not limited to an apparatus of the kind using such magnetic sheet but is applicable also to apparatuses using other rotary recording media or tape-shaped recording media such as a magnetic tape, etc.

While specific embodiments of the invention have been shown and described in detail to illustrate the application of the inventive principles, it will be understood that the invention may be embodied otherwise without departing from such principles.

What I claim:

1. An apparatus for use with a recording medium housed in a cassette, said cassette having settable means for indicating inhibition of recording or erasing operation, said apparatus comprising:

(A) means for recording signals or erasing recorded signals on or from said recording medium;
   (B) first means responsive to said settable means of said cassette for inhibiting said means for recording or erasing from recording or erasing the signals on or from said recording medium when said settable means is set to indicate inhibition of the recording or erasing operation;
   (C) second means for enabling said means for recording or erasing to record or erase signals on or from said recording medium in a condition that said first means is inhibiting the recording or erasing of the signals; and
   (D) third means for resetting said second means from its operated state at which the second means enables said means for recording or erasing to record or erase the signals regardless of said first means to its nonoperated state.

2. The apparatus according to claim 1, wherein said means for recording or erasing includes;

a recording head for recording signals on said recording medium; and
   a signal source for supplying said head with information signals to be recorded on said recording medium or erasing signals for erasing recorded information signals, wherein
   said first means is arranged to inhibit the supply of the signals from said signal source to said head; and wherein
   said second means is arranged to enable said signal source to supply said signals to said head.

3. The apparatus according to claim 2, wherein said means for recording or erasing further includes a gate circuit disposed between said signal source and said head, wherein
   said first means is arranged to inhibit said gate circuit from supplying said signals to said head; and wherein
   said second means is arranged to enable said gate circuit to supply said signals to said head.

4. The apparatus according to claim 1, wherein said second means is arranged to be operable manually from the outside of the apparatus.

5. The apparatus according to claim 1, wherein said third means is arranged to reset said second means from its operated state to its non-operated state in association with an operation for loading or unloading of said cassette on or from the apparatus.

6. An apparatus for use with a recording medium housed in a cassette, said cassette having settable means, said settable means of said cassette includes a member removable from said cassette with the absence of said member from said cassette operating to indicate inhibition of recording or erasing operation with said recording medium, said apparatus comprising:

(A) means for recording signals or erasing recorded signals on or from said recording medium;
   (B) first means responsive to said settable means of said cassette for inhibiting said means for recording or erasing from recording or erasing the signals on or from said recording medium when said member is removed from said cassette; and
   (C) second means for enabling said means for recording or erasing to record or erase signals on or from said recording medium in a condition that said first means is inhibiting the recording or erasing of the signals.

7. The apparatus according to claim 6, wherein said first means includes a detector for detecting whether said member is removed from said cassette.

8. An apparatus for use with a recording medium housed in a cassette, said cassette having counter means for indicating a used amount of said recording medium, said apparatus comprising:

(A) means for recording signals or erasing recorded signals on or from said recording medium;
   (B) counter drive means for driving said counter means of said cassette in association with recording or erasing operation of said means for recording or erasing, said counter driving means having a movable member movable and couplable with said counter means for driving the same, said movable member being arranged to be couplable with the counter means when the member has a predetermined relationship to the counter means;
   (C) first means for inhibiting said means for recording or erasing from recording or erasing the signals on or from said recording medium when said movable member of said counter drive means is not coupled with said counter means of said cassette;
   (D) second means for enabling said means for recording or erasing to record or erase the signals on or from said recording medium regardless of said first means; and
   (E) third means for resetting said second means from its operated state at which the second means enables said means for recording or erasing to record or erase the signals regardless of said first means to its nonoperated state.

9. The apparatus according to claim 8, wherein said means for recording or erasing includes:

a recording head for recording the signals on said recording medium; and
   a signal source for supplying said head with information signals to be recorded on said recording medium or erasing signals for erasing recorded information signals, wherein
   said first means is arranged to inhibit the supply of the signals from said signal source to said head; and wherein
   said second means is arranged to enable said signal source to supply said signals to said head.

10. The apparatus according to claim 9, wherein
    said means for recording or erasing further includes a gate circuit disposed between said signal source and said head, wherein
    said first means is arranged to inhibit said gate circuit from supplying said signals to said head; and wherein
    said second means is arranged to enable said gate circuit to supply said signals to said head.

11. The apparatus according to claim 8, wherein said second means is arranged to be operable manually from the outside of the apparatus.

12. The apparatus according to claim 8, wherein said fourth means is arranged to reset said second means from its operated state to its non-operated state in association with an operation for loading or unloading of said cassette on or from the apparatus.

13. An apparatus for use with a cassette housing therein a recording medium, said apparatus comprising:
   (A) means for recording signals or erasing recorded signals on or from said recording medium;
   (B) first means for selectively inhibiting said means for recording or erasing from recording or erasing the signals on or from said recording medium in accordance with a cassette loaded on the apparatus;
   (C) second means for enabling said means for recording or erasing to record or erase the signals on or from said recording medium even if said first means is inhibiting the recording or erasing of the signals; and
   (D) third means for retaining said second means at its operated state at which the second means enables said means for recording or erasing to record or erase the signals regardless of said first means.

14. The apparatus according to claim 13, wherein said means for recording or erasing includes:
   a recording head for recording the signals on said recording medium; and
   a signal source for supplying said head with information signals to be recorded on said recording medium or erasing signals for erasing recorded information signals, wherein
   said first means is arranged to selectively inhibit the supply of the signals from said signal source to said head; and wherein
   said second means is arranged to enable said signal source to supply said signals to said head.

15. The apparatus according to claim 14, wherein said means for recording or erasing further includes a gate circuit disposed between said signal source and said head, wherein
   said first means is arranged to selectively inhibit said gate circuit from supplying said signals to said head; and wherein
   said second means is arranged to enable said gate circuit to supply said signals to said head.

16. The apparatus according to claim 13, wherein said second means is arranged to be operable manually from the outside of the apparatus.

17. The apparatus according to claim 13, further comprising:
   fourth means for resetting said second means from its operated state to its non-operated state.

18. The apparatus according to claim 17, wherein said fourth means is arranged to reset said second means from its operated state to its non-operated state in association with an operation for loading or unloading of said cassette on or from the apparatus.

19. A recording apparatus for use with a cassette housing therein a recording medium, said cassette having a portion to indicate inhibition of recording, said apparatus comprising:
   (A) recording means for recording information signals on the recording medium;
   (B) detection means for detecting the indication portion of said cassette and for producing a record inhibit signal;
   (C) manually operable means for producing a record enable signal;
   (D) control means responsive to said record inhibit signal and to said record enable signal for controlling said recording means, said control means being arranged to enable the recording means to record the information signals on the recording means on the basis of said record enable signal even if said record inhibit signal is supplied thereto;
   (E) ejecting means for ejecting the cassette; and
   (F) reset means responsive to said ejecting means to reset said manually operable means.

20. An apparatus for use with a recording medium housed in a cassette, said cassette having settable means, said settable means being arranged so as to indicate in accordance with the set state of a member whether or not the recording or erasing operation with said recording medium is inhibited, said apparatus comprising:
   (A) means for recording signals or erasing recorded signals on or from said recording medium;
   (B) first means responsive to said settable means of said cassette for inhibiting said means for recording or erasing from recording or erasing the signals on or from said recording medium when said member is set to indicate inhibition of the recording or erasing operation;
   (C) second means for enabling said means for recording or erasing to record or erase signals on or from said recording medium in a condition that said first means in inhibiting the recording or erasing of the signals; and
   (D) third means for resetting said second means from its operated state at which the second means enables said means for recording or erasing to record or erase the signals regardless of said first means to its nonoperated state.

21. An apparatus according to claim 20, wherein said first means includes a detector for detecting whether or not said member indicates the inhibition of recording or erasing operation with recording medium.

22. A recording apparatus for use with a cassette housing therein a recording medium, said cassette having a portion to indicate inhibition of recording, said apparatus comprising:
   (A) recording means for recording information signals on the recording medium;
   (B) detection means for detecting the indication portion of said cassette and for producing a record inhibit signal;
   (C) manually operable means for producing a record enable signal;
   (D) control means responsive to said record inhibit signal and to said record enable signal for controlling said recording means, said control means being arranged to enable the recording means to record the information signals on the recording medium on the base of said record enable signal even if said record inhibit signal is supplied thereto; and
   (E) reset means for resetting said manually operable means.

23. An apparatus according to claim 22, further comprising:
   ejecting means for ejecting the cassette, whereby said reset means is arranged so as to be responsive to said ejecting means.

24. An apparatus for use with a recording medium held in a holding member, said holding member having settable means for indicating inhibition of recording or erasing operation, said apparatus comprising:
   (A) means for recording signals or erasing recorded signals on or from said recording medium;
   (B) first means responsive to said settable means of said holding member for inhibiting said means for recording or erasing from recording or erasing signals on or from said recording medium when said settable means is set to indicate inhibition of the recording or erasing operation;

(C) second means for enabling said means for recording or erasing to record or erase signals on or from said recording medium in a condition that said first means is inhibiting the recording or erasing of the signals; and (D) third means for resetting said second means from its operated state at which the second means enables said means for recording or erasing to record or erase the signals regardless of said first means to its nonoperated state.

25. An apparatus for use with a recording medium held in a holding member, said holding member indicating inhibition of recording or erasing operation, said apparatus comprising:

(A) means for recording signals or erasing recorded signals on or from said recording medium;

(B) first means responsive to said settable means of said holding member for inhibiting said means for recording or erasing from recording or erasing signals on or from said recording medium when said settable means is set to indicate inhibition of the recording or erasing operation;

(C) second means for enabling said means for recording or erasing to record or erase signals on or from said recording medium in a condition that said first means is inhibiting the recording or erasing of the signals; and (D) third means responsive to the operation of said means for recording signals or erasing recorded signals on or from said recording means for resetting said means from its operated state at which the second means enables said means for recording or erasing to record or erase the signals regardless of said first means to its nonoperated state.

26. An apparatus according to claim 25, wherein said second means is arranged so as to be reset from said operated state to said nonoperated state after said means for recording signals or erasing recorded signals on or from said recording medium has stopped the recording or the erasing operation.

* * * * *